United States Patent
Matsuzono

[19]

[11] Patent Number: 5,809,254
[45] Date of Patent: Sep. 15, 1998

[54] DATA COMMUNICATION MECHANISM CAPABLE OF PRODUCING DATA PACKET HAVING OPTIMAL SEGMENT SIZE IN COMMUNICATION SYSTEM

[75] Inventor: Masaya Matsuzono, Tokyo, Japan

[73] Assignee: NEC Corporation, Tokyo, Japan

[21] Appl. No.: 953,989

[22] Filed: Oct. 20, 1997

Related U.S. Application Data

[63] Continuation of Ser. No. 264,960, Jun. 24, 1994, abandoned.

[30] Foreign Application Priority Data

Jun. 24, 1993 [JP] Japan ................................. 5-153879

[51] Int. Cl.[6] .............................. G06F 13/00; H06F 13/00
[52] U.S. Cl. ................................ 395/200.65; 395/200.66; 370/230
[58] Field of Search .............................. 370/60.1, 80, 82, 370/83, 85.12, 85.14, 94.1, 94.2, 94.3, 95.1, 95.2, 95.3, 230, 235, 401, 417; 395/200.11, 200.17, 200.54, 200.65, 200.66; 340/825.05, 825.06, 825.08

[56] References Cited

U.S. PATENT DOCUMENTS

| | | | |
|---|---|---|---|
| Re. 33,426 | 11/1990 | Sugimoto | ............................ 370/85.14 |
| 4,536,874 | 8/1985 | Stoffel et al. | |
| 4,771,391 | 9/1988 | Blasbalg | ............................ 364/514 |
| 5,420,862 | 5/1995 | Perlman | ............................ 370/85.13 |
| 5,459,455 | 10/1995 | Sato | ............................ 340/825.07 |
| 5,463,777 | 10/1995 | Bialkowski | ............................ 395/600 |
| 5,515,513 | 5/1996 | Metzger | ............................ 395/200.15 |
| 5,701,292 | 12/1997 | Chiussi et al. | ............................ 395/200.65 |

Primary Examiner—Mark H. Rinehart
Attorney, Agent, or Firm—Foley & Lardner

[57] ABSTRACT

A host computer includes a segment table for storing therein a plurality of sets constructed by designated address information and maximum segment sizes corresponding thereto, and a connection end point functioning as a region to store destination network address and transmission data. A segment table generator generates the segment table. A maximum segment size reader sequentially reads the contents of the segment table when a connection is established. An optimal segment size determinator determines a maximum segment size for data transmission based on the content read from the segment table and the destination address, and stores this determined maximum segment size into a connection end point as an optimal segment size. A data transmitter transmits data to a destination in accordance with the optimal segment size stored in the connection end point.

11 Claims, 6 Drawing Sheets

FIG. 2

| NETWORK ADDRESS | MAXIMUM SEGMENT SIZE |
|---|---|
| 133. 203. 2. 14 | 1460byte |
| 133. 203. 2. 0 | 1024byte |
| 133. 201. 0. 0 | 1024byte |
| | |

FIG. 4

| NETWORK ADDRESS | NETMASK | MAXIMUM SEGMENT SIZE |
|---|---|---|
| 133. 203. 2. 14 | 0XFFFFFFFF | 1460byte |
| 133. 203. 2. 0 | 0XFFFFFF00 | 1024byte |
| 133. 201. 0. 0 | 0XFFFF0000 | 1024byte |
| | | |

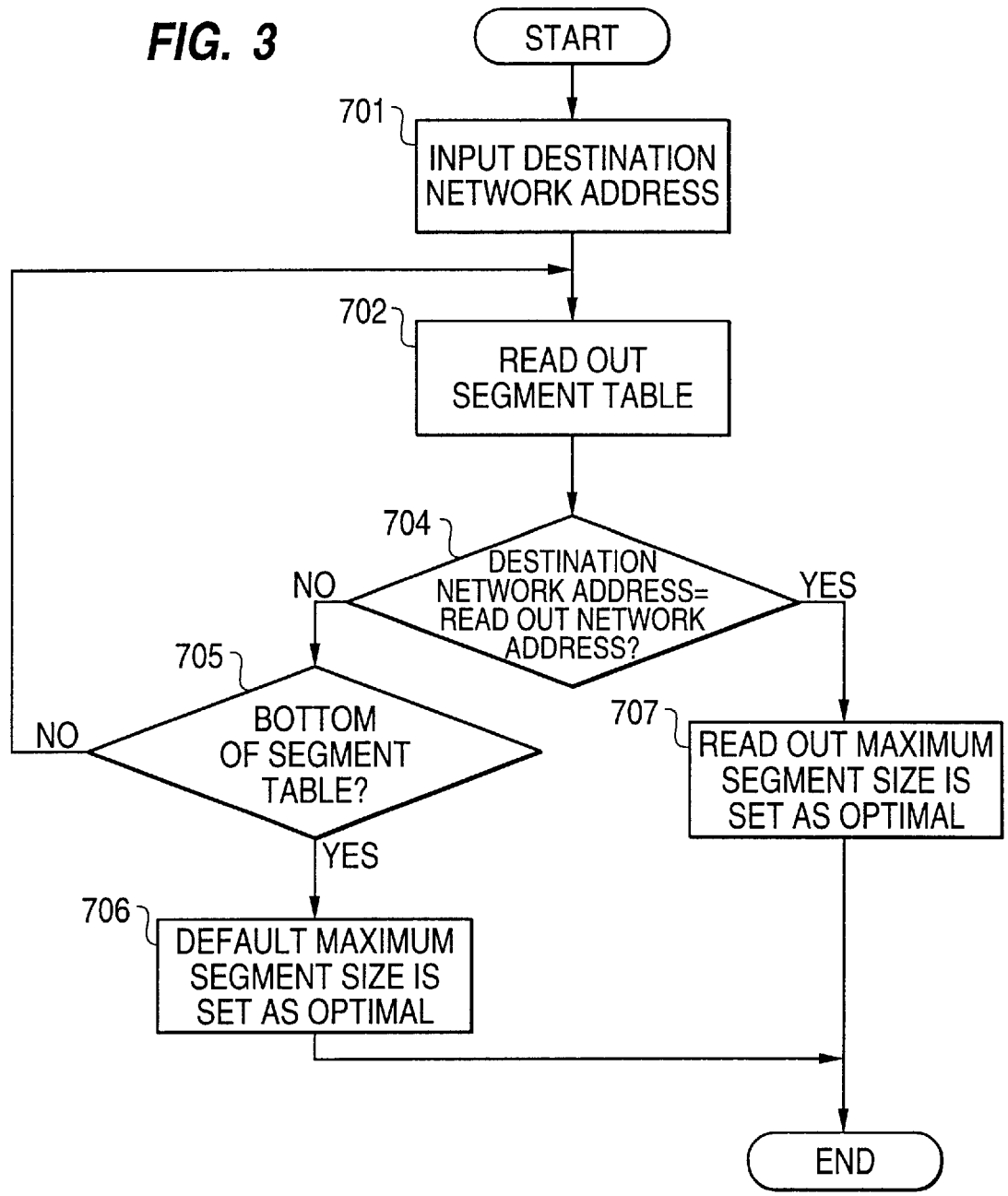

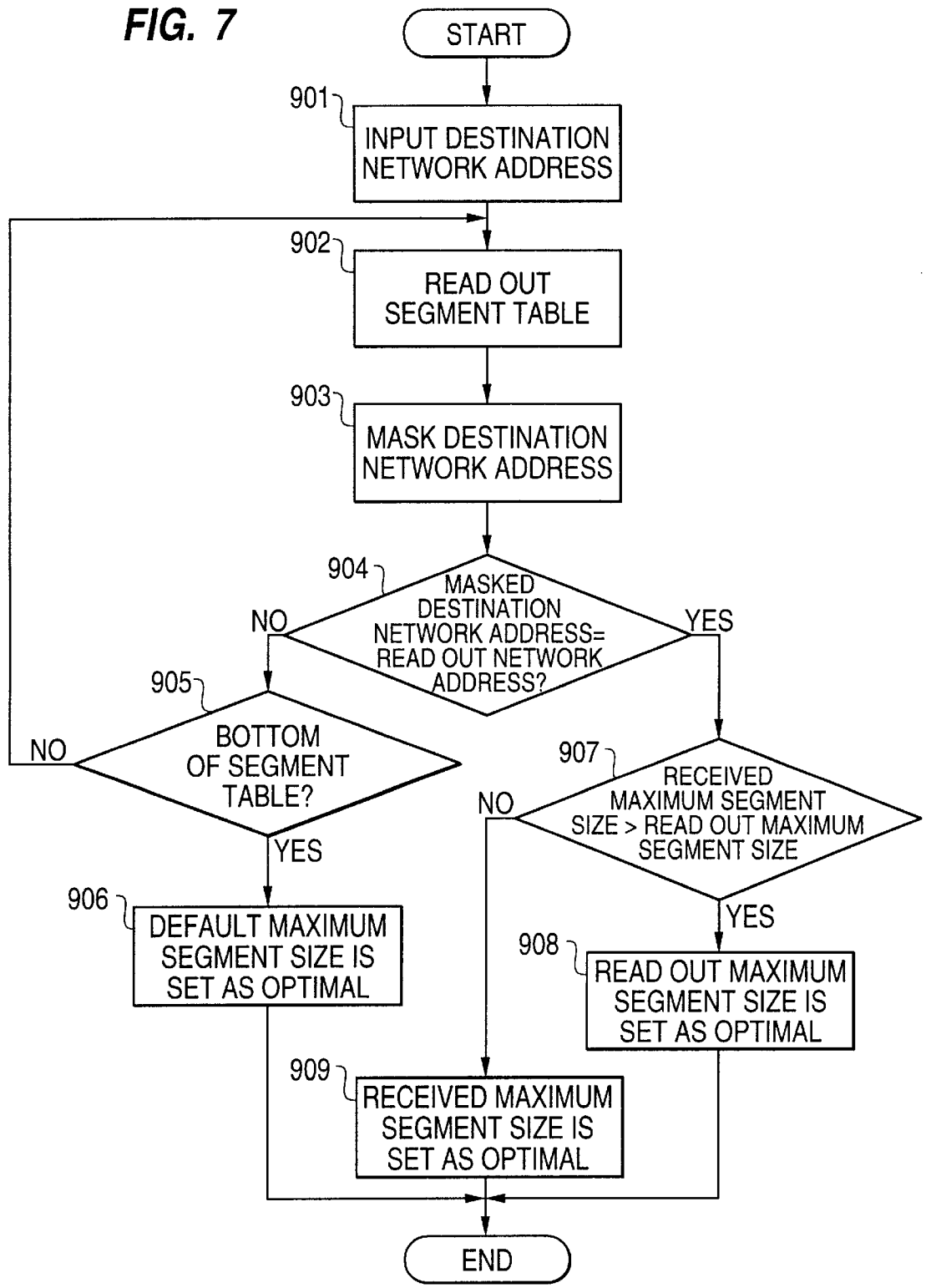

DATA COMMUNICATION MECHANISM CAPABLE OF PRODUCING DATA PACKET HAVING OPTIMAL SEGMENT SIZE IN COMMUNICATION SYSTEM

This application is a continuation of application Ser. No. 08/264,960, filed Jun. 24, 1994, abandoned.

BACKGROUND OF THE INVENTION

1. Field of the Invention

The present invention relates to a data communication network connected between computer system. More specifically, the present invention is directed to a data communication network for producing a data packet having an optimum segment size to perform the data packet communication.

2. Description of the Prior Art

In a data communication among computer systems, a data packet is subdivided into a unit referred to a "segment" which is to be transferred. The reason why the data packet is subdivided into "segments", is that there is a specific limitation in an amount of data which can be handled at one time by either a host computer, or a gateway employed in a computer system under communication.

However, normally, the size of this segment is set to such a range where the segment size does not depend on the gateway between the host computers in the conventional data communication network. For instance, in the transport connection protocol corresponding to the protocol of the transport layer, the default maximum segment size is defined as 536 bytes.

As previously described, when such a small fixed segment size is utilized in the conventional data communication system due to safety concept, the packet would be separated in vain. Therefore, a large number of packets would be produced. As a consequence, overhead in packet processing would be increased, resulting in deterioration of communication performance.

Also, as previously stated, the amount of data may be conceived as the factor to limit the segment size, which can be handled at one time by the host computer or the gateway employed in the computer system under communication. However, users do not always desire that the specific optimum segment sizes are set to the respective host computers. For example, the data communication may be carried out under similar conditions with respect to a preselected set of host computers.

SUMMARY OF THE INVENTION

The present invention has been made to solve the above-described problems and also limitations, and therefore has an object to provide a data communication network in which a data packet having an optimal segment size suitable to communication conditions of the respective communication paths can be produced to perform a data communication among computer systems.

Another object of the present invention is to provide a data communication network in which the optimal segment size is designated for each of specific groups.

To achieve the above-described objects, a communication mechanism according to a preferred embodiment of the present invention, in which a data packet communication in unit of segment is performed between host computers connected via a gateway and a network, comprising:

the communication network includes a segment table storing at least one entry containing address information about respective host computers and maximum segment size of respective host computers: and when address information about a host computer to which a data packet is transmitted is contained in the segment table, said maximum segment size corresponding to the address information is utilized so as to determine an optimal segment size.

BRIEF DESCRIPTION OF THE DRAWINGS

The invention will now be described further by way of an example only and with reference to the accompanying drawings in which:

FIG. 2 schematically illustrates a structure of a segment table employed in the first embodiment of the computer system of FIG. 1;

FIG. 3 is a flow chart for representing a process sequence of an optimal segment size determinator employed in the first embodiment of the computer system of FIG. 1;

FIG. 4 schematically shows a structure of a segment table employed in a communication network according to a second preferred embodiment of the present invention;

FIG. 7 is a flow chart for explaining a process sequence of an optimal segment size designator employed in the communication mechanism of the third preferred embodiment of the present invention.

In the drawings, identical reference numerals indicate similar components.

DETAILED DESCRIPTION OF THE PREFERRED EMBODIMENTS

Referring now to drawings, a communication mechanism according to an embodiment of the present invention will be described in detail.

Figure 1:
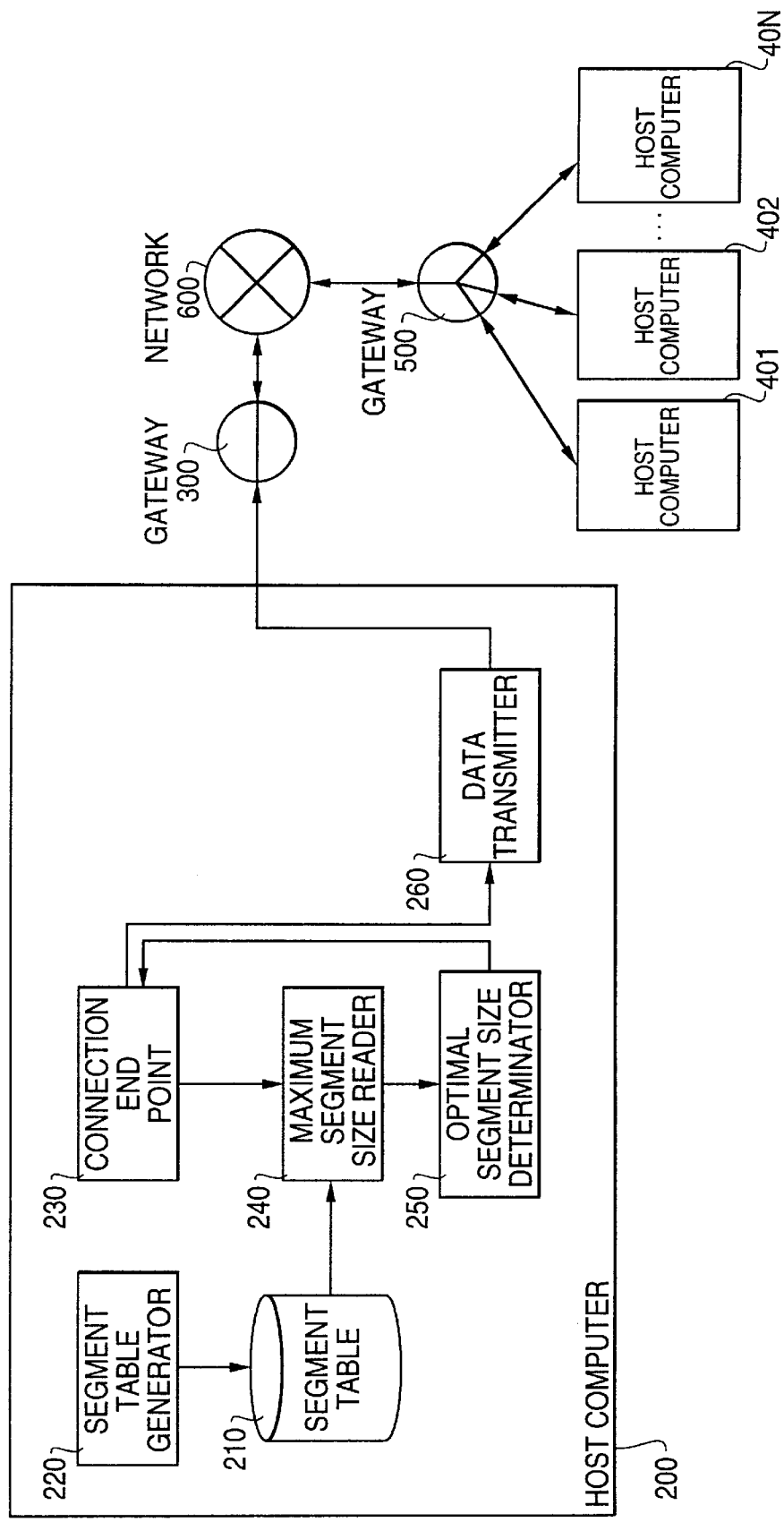
FIG. 1 is a schematic block diagram for showing an arrangement of a computer system used to explain a communication mechanism according to a first preferred embodiment of the present invention.

Referring to FIG. 1, in a data communication mechanism according to a first presently preferred embodiment of the present invention, a host computer 200 is connected to a network 600 via a gateway 300. Similarly, other host computers 401 to 40N ("N" being any integer) are connected to this network 600 via a gateway 500. Addresses of the respective host computers 200 and 401 to 40N are constructed of network addresses and host addresses.

The host computer 200 is arranged by a segment table 210 for storing therein plural sets of designated address information and corresponding maximum segment sizes, a segment table generator 220 for generating the segment table 210, a connection end point 230 functioning as a region for storing network addresses of destination transmitters and transmission data, and a maximum segment size reader 240 for sequentially reading the contents of the segment table 210 when the connection is established. This host computer 200 further includes an optimal segment size determinator 250 for determining the maximum segment size for data transmission based on the read contents of the segment table 210 and the destination address of transmission, and for causing the connection end point 230 to store this maximum segment size, and a data transmitter 260 for transmitting the data to the destination in accordance with the optimal segment size stored in the connection end point 230.

The above-described designated address information stored in the segment table 210 contains the destination addresses. The optimal segment size designator 250 selects the maximum segment size when one of these destination addresses sequentially read from the maximum segment size reader 240 is coincident with the destination address to be transmitted, and this selected maximum segment size corresponds to one of these addresses. Thus, the selected maximum segment size is held as the optimal segment size in the connection end point 230.

As represented in FIG. 1 and FIG. 2, the segment table 210 employed in the first embodiment of the present invention holds both the network address of the corresponding host computer and the maximum segment size thereof in a pair. It should be understood in this embodiment that the designated address information corresponds to an internet protocol address (will be referred to an "IP address" hereinafter).

On receiving an instruction of creating a segment table issued from an input device (not shown), the segment table generator 220 causes the segment table 210 to store therein the address of this instructed destination and the maximum segment size thereof. It should be noted that this maximum segment size is defined by taking account of an amount of data which may be handled by the gateway provided on the communication path with the destination host computer and by this destination host computer at one time.

To perform a data communication, destination network addresses end data to be transmitted are set to the connection end point 230. In case that an instruction to establish a connection is issued from the input device (not shown), the maximum segment size reader 240 sequentially reads the network addresses from the segment table 210. The optimal segment size determinator 250 retrieves such a network address coincident with the destination network addresses set in the connection end point 230. When the retrieved network address is coincident with the destination network address, the optimal segment size determinator 250 selects the maximum segment size corresponding to the destination address read from the segment table 210, and then sets this selected maximum segment size to the connection end point 230.

Upon issuance of an instruction of data transmission from the input device (not shown), the data transmitter 260 transmits the data based on the above-described optimal segment size set to the connection end point 230. For instance, in case of the data transmission with respect to the host computer 401, a data packet sent from the host computer 200 is entered to the network 600 via the gateway 300. Then, this data packet is further transmitted 500 to the host computer 401 via the gateway 500.

Operations of the optimal segment size determinator 250 will now be described with reference to a flow chart shown in FIG. 3 in conjunction with the circuit arrangement of the computer system of FIG. 1. In the flow chart of FIG. 3, when the destination network address is input (step 701), the maximum segment size reader 240 sequentially reads out the network address from the segment table 210 (step 702). Then, the optimal segment size determinator 250 judges whether or not the network address read from the segment table 210 is coincident with the destination network address set into the connection end point 230 (step 704). When the judgment result becomes "YES", the optimal segment size determinator 250 sets the maximum segment size which has been stored in the segment table 210 in a pair with this network address, as an optimal segment size, into the connection end point 230 (step 707).

On the contrary, when the optimal segment size determinator 250 judges that both of these network addresses are not coincident with each other at the step 704, the maximum segment size reader 240 reads out the next network address from the segment table 210. It should be noted that when all the network addresses stored in the segment table 210 are investigated and there is no coincidence among the investigated network addresses (step 705), the optimal segment size determinator 250 sets as an optimal segment size to the connection end point 230, such a maximum segment size which has been determined as a default value similar to that of the conventional computer system (step 706).

As previously described, in the above-explained communication network in the computer system according to the first preferred embodiment, since the maximum segment size can be freely set in correspondence to the characteristics of the gateway 300 and 500 involved in the communication path, there are advantages that separations of the data packets can be restrained to increase the data communication efficiency.

Now, a description will be made on a communication mechanism according to a second preferred embodiment of the present invention with reference to FIG. 1 and FIG. 4.

As seen from contents of a segment table 210 shown in FIG. 4, this segment table 210 hold a netmask used to interpret a network address in addition to the table function thereof as discussed in the first embodiment. As a result, when a connection establishment is instructed from the input device (not shown), the optimal segment size determinator 250 compares the network address read out from the maximum segment size reader 240 with the network address of the designated host computer 200 which is masked by the netmask held in the segment table 210. When the read network address is coincident with the netmasked network address, the maximum segment size stored in the corresponding memory position of the segment table 210 is selected, and thereafter set as the optimal segment size into the connection end point 230.

Figure 5:
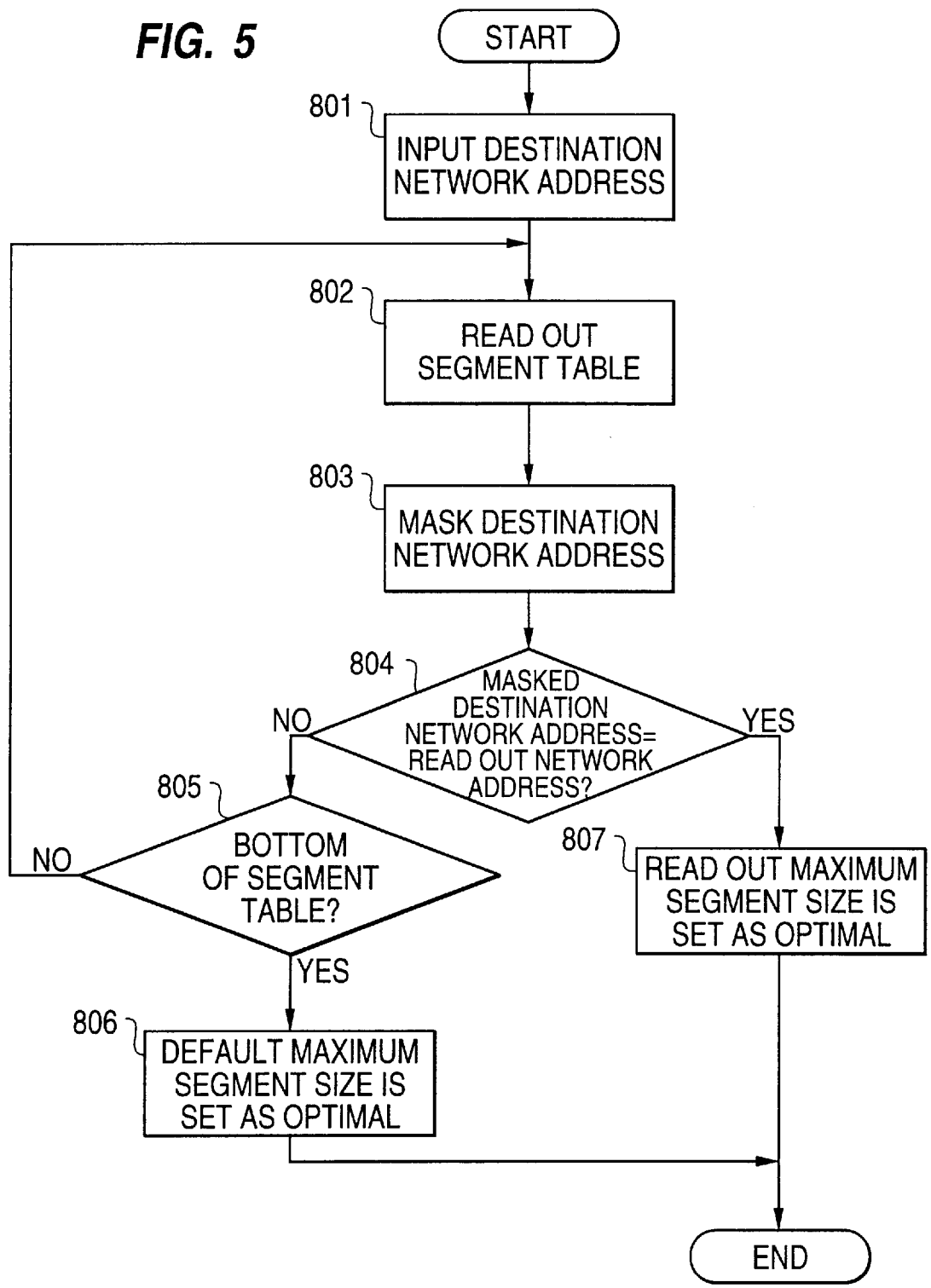
FIG. 5 is a flow chart for explaining a process sequence of an optimal segment size determinator employed in the communication network of the second preferred embodiment.

Referring to FIG. 5, the process operation of the optimal segment size determinator 250 in the second embodiment is the same as that of the first embodiment shown in FIG. 3, except that the destination network address is masked by the netmask at a step 803. As a consequence, for instance, when the destination network address "133.203.2.15" is retrieved, the following interpretation is made: First, at a first stage, since all bits of the netmask are equal to "1", the network address is not masked. As a result, when the stored address "133.203.2.14" is compared with the designation address "133.203.2.15", there is no coincidence. However, at a second stage, since the lower portion of the netmask is "0" (see FIG. 4), a portion of the destination address is masked by the netmask. That is, since the destination mask "133.203.2.15" is masked and then is interpreted as "133.203.2.0", this masked address becomes coincident with the stored address "133.203.2.0". As a consequence, 1024 bytes are selected as the optimal segment size (see FIG. 4).

As previously explained, in accordance with the second embodiment, when the segment size is set to the segment table 210, the network address can be displayed in every group, so that the memory capacity of the segment table 210 can be reduced.

Figure 6:
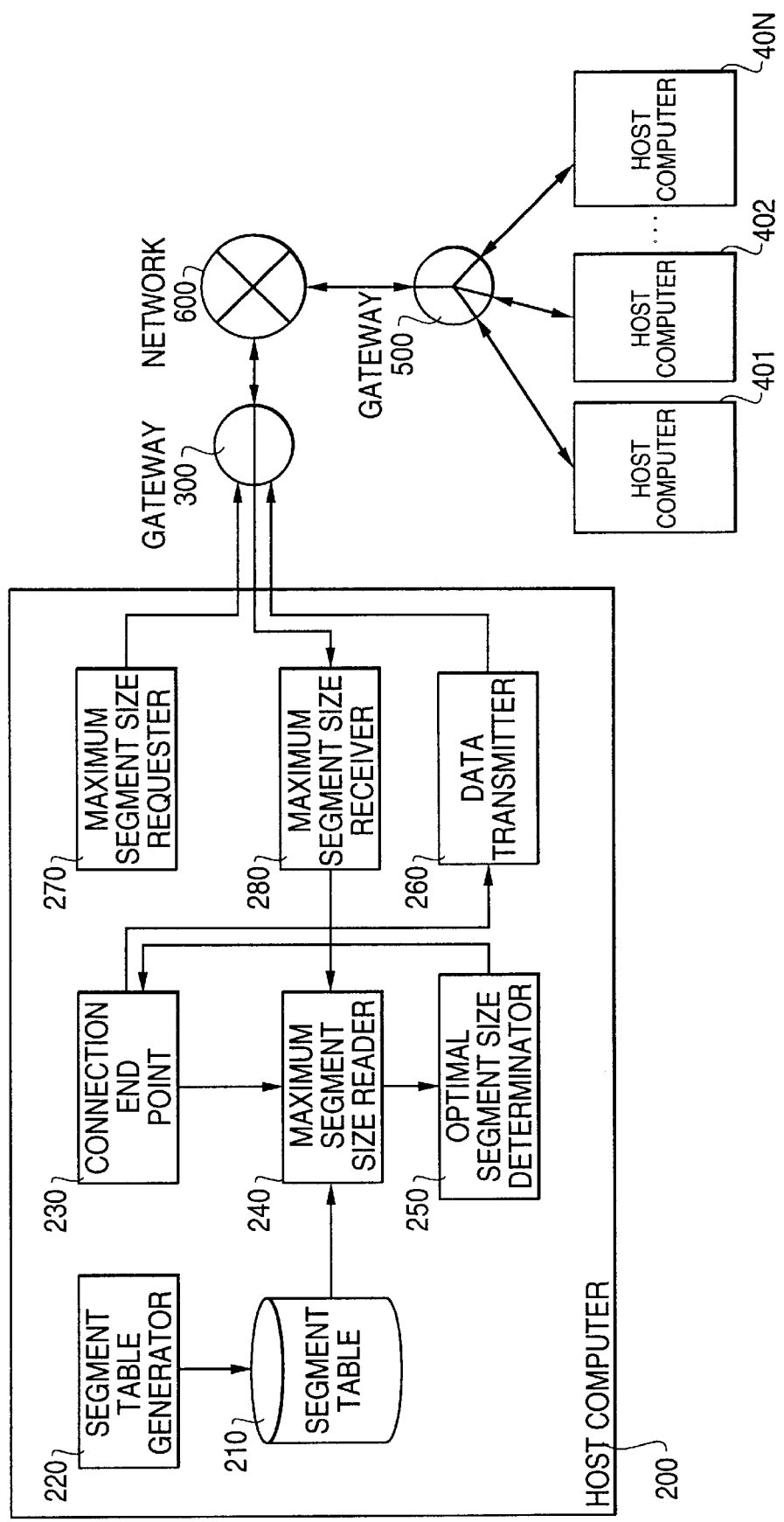
FIG. 6 is a schematic block diagram of a computer system used to describe a communication network according to a third preferred embodiment of the present invention.

Referring mainly to FIG. 6, an optimal segment size generating mechanism employed in a communication mechanism according to a third preferred embodiment of the present invention will be described. As represented in FIG. 6, the host computer 200 includes, in addition to the previously described arrangements of the first embodiment shown in FIG. 1, a maximum segment size requester 270 and a maximum segment size receiver 280. The maximum segment size requester 270 requests the destination host computer to transfer the maximum segment size. The maximum segment size receiver 280 receives the request of the maximum segment size issued from the destination host computer.

Upon receipt of an instruction to receive the maximum segment size from the input device (not shown), the maximum segment size requester 270 sends out a request packet to the destination host computer. This destination host computer which has received the above-mentioned request packet returns such a memory capacity capable of storing the transmission data within one time as the maximum segment size to the host computer which has sent this request packet. In this requesting host computer, the maximum segment size receiver 280 receives this maximum segment size and transfers the maximum segment size to the maximum segment size reader 240. The optimal segment size determinator 250 receives from the maximum segment size reader 240 both of the maximum segment size derived from the maximum segment size receiver 280, and the maximum segment size derived from the segment table 210, and thereafter determines the optimal segment size based on these maximum segment sizes.

Referring now to the system arrangement of FIG. 6 and a flow chart of FIG. 7, operations of the optimal segment size designator 250 will be described.

In the flow chart of FIG. 7, when a destination network address is first entered (step 901), the maximum segment size reader 240 sequentially reads the network address and the netmask from the segment table 210 (step 902). Then, the optimal segment size determinator 250 masks the destination network address set in the connection end point 230 by the netmask (step 903). Subsequently, the optimal segment size determinator 250 judges whether or not this masked address is coincident with the network address read from the segment table 210 at the previous step 902 (step 904). When the coincident judgement result becomes "YES", the optimal segment size determinator 250 compares the maximum segment size paired with this network address, stored in the segment table 210, with the maximum segment size derived from the maximum segment size receiver 280 (step 907).

When the optimal segment size determinator 250 makes such a decision at the step 907 that the maximum segment size derived from the maximum segment size receiver 280 is greater than the maximum segment size read out from the segment table 210, this optimal segment size determinator 250 sets as the optimal segment size the maximum segment size read from the segment table 210 to the connection end point 230 (step 908). Conversely, when the optimal segment size determinator 250 makes such a decision at the step 907 that the maximum segment size derived from the maximum segment size receiver 280 is smaller than the maximum segment size read from the segment table 210, this optimal segment size determinator 250 sets as the optimal segment size the maximum segment size derived from the maximum segment size receiver 280 to the connection end point 230 (step 909).

Also, when the optimal segment size determinator 250 makes a judgement at the previous step 904 that both of the network address and the masked address are not coincident with each other, the optimal segment size determinator 250 reads out the subsequent network address from the segment table 210. It should be understood that when the optimal segment size determinator 250 has checked the address coincidence as to all of the network addresses stored in the segment table 210 and has obtained such a check result that all of these addresses are not coincident to each other (step 905), the optimal segment size determinator 250 sets as the optimal segment size to the connection end point 230, the maximum segment size which has been previously determined as the default value in a similar manner to the conventional network system (step 906).

As previously described in detail, according to the third embodiment, when the segment size is set to the segment table 210, the maximum segment size is previously reported from the destination host computer, so that the optimal segment size can be properly set, taking account of the communication conditions of this destination host computer.

As apparent from the foregoing descriptions, in accordance with the data communication mechanism of the present invention, since the maximum segment size can be freely set based upon the conditions of the communication paths, the separations of the data packets can be prevented, thereby increasing the communication efficiency.

There is another advantage that since the networks may be displayed in every group, the memory capacity of the segment table can be reduced.

Furthermore, there is other advantage that the optimal segment size can be determined based on the communication conditions of the destination host computer.

What is claimed is:

1. A communication mechanism for transmitting a data packet containing a segment between a plurality of host computers connected via a gateway and a network, the segment corresponding to an amount of data to be transmitted in the network between two devices in the network, the communication mechanism comprising:

a segment table in each of said host computers, each said segment table storing a plurality of entries containing address information about other ones of said host computers and a maximum segment size of said segment to be transmitted to said other ones of said host computers, said maximum segment size of said segment to be transmitted to said other ones of said host computers being a value unrelated to a current load capacity of the network, wherein when one of said host computers transmits a data packet to another one of said host computers and when address information about said another one of said host computers is contained in said segment table of said one of said host computers, said one of said host computers transmits the data packet with a segment having a size that does not exceed a maximum segment size corresponding to said address information of said another one of said host computers.

2. A communication mechanism for transmitting a data packet containing a segment between a plurality of host computers connected via a gateway and a network, the segment corresponding to an amount data to be transmitted in the network between two devices in the network, the communication mechanism comprising:

a segment table in each of said host computers for storing therein at least one pair of a network address for said each of said host computers and a maximum segment size of said each of said host computers, said maximum segment size of said each of said host computers being a value unrelated to a current load capacity of the network;

a connection end point in each of said host computers for storing data to be transmitted from said corresponding host computer and a destination network address for said data to be transmitted;

a segment table generator in each of said host computers for providing said network address and said maximum segment size to said corresponding segment table;

a maximum segment size reader in each of said host computers for reading said destination network address from said corresponding connection end point and for sequentially reading the contents of said corresponding segment table;

a segment size determinator in each of said host computers for receiving both of said destination network address and the contents of said corresponding segment table from said corresponding maximum segment size reader, wherein when said destination network address is contained in said corresponding segment table, said corresponding segment size determinator sets a maximum segment size corresponding to said destination network address as a segment size to said corresponding connection end point; and a data transmitter in each of said host computers for transmitting said data to said destination address in accordance with said segment size set to said corresponding connection end point, wherein when one of said host computers transmits a data packet to another of said host computers and when address information about said another of said host computers is contained in said segment table in said one of said host computers, said one of said host computers transmits the data packet with a segment having a size which does not exceed a maximum segment size corresponding to said address information of said another of said host computers.

3. A communication mechanism as claimed in claim 2, wherein said segment table further stores a netmask paired with the network address of each of said host computers, said netmask being used to mask the destination network address in order to interpret said destination network address, and wherein said segment size determinator sets a maximum segment size corresponding to said masked network address to said connection end point as the segment size when said masked network address is contained in said segment table.

4. A communication mechanism for transmitting a data packet containing a segment between a plurality of host computers connected via a gateway and a network, the segment corresponding to an amount of data to be transmitted in the network between two devices in the network, the communication mechanism comprising:

a segment table in each of said host computers for storing therein at least one pair of a network address for one of said host computers and a maximum segment size of said one of said host computers, said maximum segment size being a value unrelated to a current load capacity of the network;

a connection end point in each of said host computers for storing data to be transmitted from said corresponding host computer and a destination network address for said data to be transmitted, said destination network address corresponding to a destination host computer;

a segment table generator in each of said host computers for providing said network address and said maximum segment size to said corresponding segment table;

a maximum segment size requester in each of said host computers for requesting said destination host computer to provide a maximum segment size;

a maximum segment size receiver in each of said host computers for receiving the provided maximum segment size from said destination host computer;

a maximum segment size reader in each of said host computers for reading said destination network address from said corresponding connection end point, for receiving the provided maximum segment size of said destination host computer from said corresponding maximum segment size receiver, and for sequentially reading the contents of said corresponding segment table;

a segment size determinator in each of said host computers for receiving said destination network address from said corresponding maximum segment size reader, the provided maximum segment size of said destination host computer, and the contents of said corresponding segment table, wherein when said destination network address is contained in said segment table, said optimal segment size determinator sets as a segment size into said corresponding connection end point, a smaller one of: i) a maximum segment size corresponding to said destination network address that has been retrieved from said corresponding segment table, and ii) said provided maximum segment size that has been received from said destination host computer; and a data transmitter in each of said host computers for transmitting said data at said destination network address in accordance with said segment size set to said corresponding connection end point, wherein when one of said host computers transmits a data packet to another of said host computers and when address information about said another of said host computers is contained in said segment table in said one of said host computers, said one of said host computers transmits the data packet with a segment having a size which does not exceed a maximum segment size corresponding to said address information of said another of said host computers.

5. A communication mechanism as claimed in claim 4, wherein said segment table further stores a netmask paired with the network address of each of said host computers, said netmask being used to mask the destination network address in order to interpret said destination network address, and wherein said segment size determinator sets said smaller one of the corresponding maximum segment size and the provided maximum segment size of said destination host computer to said corresponding connection end point as the segment size when said masked destination network address is contained in said corresponding segment table.

6. A communication mechanism as claimed in claim 1, wherein said maximum segment size of said segment to be transmitted to said another one of said host computers is set irrespective of an amount of traffic currently flowing within said network.

7. A communication mechanism as claimed in claim 1, wherein said maximum segment size of said segment to be transmitted to said another one of said host computers is set based only on characteristics of said another one of said host computers.

8. A communication mechanism as claimed in claim 2, wherein said maximum segment size of said segment to be transmitted to said another of said host computers is set irrespective of an amount of traffic currently flowing within said network, and wherein said plurality of entries stored in said segment table are inputted thereto from said corresponding one of said host computers prior to any data transfer in the network between any of said host computers.

9. A communication mechanism as claimed in claim 2, wherein said maximum segment size of said segment to be transmitted to said another of said host computers is set based only on characteristics of said another of said host computers, wherein said segment table generator creates the corresponding segment table based on at least one instruction received from said corresponding one of said host computers, and wherein said segment table is created prior to any data transfer in the network between any of the host computers.

10. A communication mechanism as claimed in claim 4, wherein said maximum segment size of said segment to be transmitted to said another of said host computers is set irrespective of an amount of traffic currently flowing within said network.

11. A communication mechanism as claimed in claim 4, wherein said maximum segment size of said segment to be transmitted to said another of said host computers is set based only on characteristics of said another of said host computers, wherein said segment table generator creates the corresponding segment table based on at least one instruction received from said corresponding one of said host computers, and wherein said segment table is created prior to any data transfer in the network between any of the host computers.

* * * * *